(12) United States Patent
Kim et al.

(10) Patent No.: US 7,180,709 B2
(45) Date of Patent: Feb. 20, 2007

(54) INFORMATION-STORAGE MEDIA WITH DISSIMILAR OUTER DIAMETER AND/OR INNER DIAMETER CHAMFER DESIGNS ON TWO SIDES

(75) Inventors: Kwang Kon Kim, San Jose, CA (US); Ramon Clasara, San Jose, CA (US); Charles F. Peabody, Berthoud, CO (US)

(73) Assignee: Maxtor Corporation, Longmont, CO (US)

(*) Notice: Subject to any disclaimer, the term of this patent is extended or adjusted under 35 U.S.C. 154(b) by 492 days.

(21) Appl. No.: 10/435,358

(22) Filed: May 9, 2003

(65) Prior Publication Data

US 2003/0210498 A1 Nov. 13, 2003

Related U.S. Application Data

(60) Provisional application No. 60/379,064, filed on May 9, 2002.

(51) Int. Cl.
*G11B 5/82* (2006.01)
*G11B 23/38* (2006.01)

(52) U.S. Cl. .................................... 360/135
(58) Field of Classification Search ................. 360/135
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | 53/168 |
| 4,573,851 A | 3/1986 | Butler | 414/404 |
| 4,669,612 A | 6/1987 | Mortensen | |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,724,963 A | 2/1988 | Mortensen | |
| 4,768,328 A | 9/1988 | Mims | 53/532 |
| 4,808,456 A * | 2/1989 | Yamada et al. | 428/823 |
| 4,819,579 A | 4/1989 | Jenkins | 118/728 |
| 4,840,530 A | 6/1989 | Nguyen | 414/404 |
| 4,856,957 A | 8/1989 | Lau et al. | 414/404 |
| 4,939,891 A | 7/1990 | Podini | |
| 4,947,624 A | 8/1990 | Cones, Sr. et al. | 53/540 |
| 4,947,784 A | 8/1990 | Nishi | 414/404 |
| 4,949,848 A | 8/1990 | Kos | |
| 4,958,982 A | 9/1990 | Champet et al. | 414/751.1 |
| 4,962,879 A | 10/1990 | Goesele et al. | 228/116 |
| 4,981,222 A | 1/1991 | Lee | 211/41 |
| 4,987,407 A | 1/1991 | Lee | 340/540 |

(Continued)

FOREIGN PATENT DOCUMENTS

| | | | | |
|---|---|---|---|---|
| EP | 0 177 073 | 8/1985 | | |
| EP | 0 192 244 | 2/1986 | | |
| EP | 768704 | 4/1997 | | 414/416.02 |
| JP | 60253078 A * | 12/1985 | | |
| JP | 63122527 A * | 5/1988 | | |

(Continued)

OTHER PUBLICATIONS

Australian Written Opinion and Search Report, Dec. 17, 2004, Singapore Application No. SG200302857-8.

(Continued)

*Primary Examiner*—William J Klimowicz (57) ABSTRACT

A single-sided magnetic hard disk 200 is provided that includes opposing first and second sides 300 and 308 having opposing first and second chamfers 408 and 412, respectively. The first chamfer 408 is dissimilar (or differently shaped) from the second chamfer 412.

57 Claims, 4 Drawing Sheets

U.S. PATENT DOCUMENTS

| | | | |
|---|---|---|---|
| 5,007,788 A | 4/1991 | Asano et al. | 414/416.09 |
| 5,111,936 A | 5/1992 | Kos | 206/334 |
| 5,125,784 A | 6/1992 | Asano | 414/404 |
| 5,188,499 A | 2/1993 | Tarng et al. | 414/404 |
| 5,250,339 A | 10/1993 | Tani et al. | |
| 5,269,643 A | 12/1993 | Kodama et al. | 414/416 |
| 5,314,107 A | 5/1994 | D'Aragona et al. | 228/116 |
| 5,348,151 A | 9/1994 | Dressen | |
| 5,351,156 A | 9/1994 | Gregory et al. | |
| 5,430,992 A | 7/1995 | Olson | 53/399 |
| 5,476,176 A | 12/1995 | Gregerson et al. | |
| 5,478,622 A | 12/1995 | Nakamura et al. | |
| 5,480,695 A | 1/1996 | Tenhover et al. | |
| 5,486,134 A | 1/1996 | Jones et al. | 451/209 |
| 5,497,085 A * | 3/1996 | Tian et al. | 324/212 |
| 5,501,568 A | 3/1996 | Ono | 414/417 |
| 5,612,830 A | 3/1997 | Gregory et al. | |
| 5,620,295 A | 4/1997 | Nishi | 414/416.11 |
| 5,664,407 A | 9/1997 | Cooper, III et al. | 53/542 |
| 5,665,478 A | 9/1997 | Suzuki et al. | |
| 5,773,124 A | 6/1998 | Ishakawa et al. | |
| 5,780,127 A | 7/1998 | Mikkelsen | |
| 5,820,449 A | 10/1998 | Clover | 451/287 |
| 5,906,469 A | 5/1999 | Oka et al. | |
| 5,926,352 A * | 7/1999 | Murayama et al. | 360/135 |
| 5,928,759 A | 7/1999 | Arita et al. | |
| 5,956,317 A | 9/1999 | Komiyama et al. | 369/286 |
| 5,976,255 A | 11/1999 | Takaki et al. | 118/500 |
| 5,991,104 A | 11/1999 | Bonyhard | |
| 6,007,896 A | 12/1999 | Bhushan | |
| 6,033,486 A | 3/2000 | Andros | |
| 6,033,522 A | 3/2000 | Iwata et al. | 156/345 |
| 6,086,961 A | 7/2000 | Bonyhard | |
| 6,107,599 A | 8/2000 | Baumgart et al. | 219/121.77 |
| 6,117,570 A | 9/2000 | Chen et al. | |
| 6,120,890 A | 9/2000 | Chen et al. | |
| 6,150,015 A | 11/2000 | Bertero et al. | |
| 6,182,814 B1 | 2/2001 | Koehler | 198/418.7 |
| 6,345,947 B1 | 2/2002 | Egashira | 414/225.01 |
| 6,354,794 B2 | 3/2002 | Sato et al. | |
| 6,368,040 B1 | 4/2002 | Yamasaki et al. | |
| 6,427,850 B2 | 8/2002 | Mendiola | 211/41.18 |
| 6,457,929 B2 | 10/2002 | Sato et al. | |
| 6,498,086 B1 | 12/2002 | Zheng | |
| 6,582,279 B1 | 6/2003 | Fox et al. | 451/37 |
| 6,595,028 B1 | 7/2003 | Miyamoto et al. | |
| 6,596,083 B2 | 7/2003 | Cromwell et al. | |
| 6,612,801 B1 | 9/2003 | Koguchi | 414/416.02 |
| 6,625,835 B1 | 9/2003 | Frost et al. | 15/77 |
| 6,626,744 B1 | 9/2003 | White et al. | 451/66 |
| 6,664,503 B1 | 12/2003 | Hsieh et al. | |
| 6,769,855 B2 | 8/2004 | Yokomori et al. | 414/416.02 |
| 6,818,331 B2 | 11/2004 | Sakawaki et al. | |
| 6,821,653 B2 | 11/2004 | Fukushima et al. | |
| 6,926,977 B2 | 8/2005 | Osawa et al. | |
| 6,942,933 B2 | 9/2005 | Osawa | |
| 7,027,246 B2 | 4/2006 | Valeri | |
| 2001/0049031 A1 | 12/2001 | Bajorek et al. | |
| 2001/0053444 A1 | 12/2001 | Yokoyama et al. | |
| 2002/0006324 A1 | 1/2002 | Sato et al. | 414/416.12 |
| 2002/0054976 A1 | 5/2002 | Nakamura et al. | |
| 2002/0055017 A1 | 5/2002 | Fukushima et al. | |
| 2002/0081181 A1 | 6/2002 | Yokomori et al. | |
| 2002/0132043 A1 | 9/2002 | Cromwell et al. | |
| 2002/0142707 A1 | 10/2002 | Shimada et al. | |
| 2002/0159177 A1 | 10/2002 | Aoki et al. | |
| 2003/0082407 A1 | 5/2003 | Sakawaki et al. | |
| 2003/0104253 A1 | 6/2003 | Osawa et al. | |
| 2003/0179692 A1 * | 9/2003 | Ohotomo | 369/280 |
| 2003/0194464 A1 | 10/2003 | Iida et al. | |
| 2003/0208899 A1 | 11/2003 | Grow et al. | 29/458 |
| 2003/0209389 A1 | 11/2003 | Buitron et al. | 184/6 |
| 2003/0209421 A1 | 11/2003 | Buitron et al. | 204/192.2 |
| 2003/0211275 A1 | 11/2003 | Buitron et al. | 428/64.1 |
| 2003/0211361 A1 | 11/2003 | Kim et al. | 428/694 R |
| 2004/0005481 A1 | 1/2004 | Osawa | |
| 2004/0013011 A1 | 1/2004 | Valeri | 365/200 |
| 2004/0016214 A1 | 1/2004 | Buitron | 53/474 |
| 2004/0023074 A1 | 2/2004 | Shimizu et al. | |
| 2004/0035737 A1 | 2/2004 | Buitron et al. | 206/454 |
| 2004/0037005 A1 | 2/2004 | Osawa | |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |
| 2004/0072029 A1 | 4/2004 | Lowery et al. | |
| 2004/0170870 A1 | 9/2004 | Yokoyama et al. | |
| 2005/0003106 A1 | 1/2005 | Isozaki | |
| 2005/0037140 A1 | 2/2005 | Sakawaki et al. | |
| 2005/0121839 A1 | 6/2005 | Fukushima et al. | |
| 2005/0132958 A1 | 6/2005 | Leng et al. | |

FOREIGN PATENT DOCUMENTS

| | | | |
|---|---|---|---|
| JP | 04067333 A * | 3/1992 | |
| JP | 05028533 A * | 2/1993 | |
| JP | 06076384 A * | 3/1994 | |
| JP | 06203527 A * | 7/1994 | |
| JP | 07235083 A * | 9/1995 | |
| JP | 7-263521 | 10/1995 | 414/416.02 |
| JP | 07296418 A * | 11/1995 | |
| JP | 08249802 A * | 9/1996 | |
| JP | 08273210 | 10/1996 | |
| JP | 09259473 A * | 10/1997 | |
| JP | 10228674 A * | 8/1998 | |
| JP | 11265506 A * | 9/1999 | |
| JP | 2000331456 A * | 11/2000 | |
| JP | 2001232667 | 8/2001 | |
| JP | 2001283469 A * | 10/2001 | |
| JP | 2002216454 A * | 8/2002 | |
| WO | WO 9836867 A1 | 8/1998 | |

OTHER PUBLICATIONS

Mar. 12, 2005 Invitation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; p. 58-63.

US 5,762,201, 6/1998, Whalen (withdrawn).

Pang, S.I. et al., "Effects of Nitrogenated NiP Seedlayer on Co-Alloy Thin Film Media," 1494-96, IEEE Transactions on Magnetics, vol. 37, No. 4 (Jul. 2001).

Tsingberg, M. Eggrs, C., "DVD technology"; Image Processing, 1998 ICIP 98 Proceedings. 1998 Int'l Conf on vol. 1; Oct. 4-7, 1998, p. 2: 2 vol. 1.

US 5,762,201, 06/1998, Whalen (withdrawn)

* cited by examiner

INFORMATION-STORAGE MEDIA WITH DISSIMILAR OUTER DIAMETER AND/OR INNER DIAMETER CHAMFER DESIGNS ON TWO SIDES

CROSS REFERENCE TO RELATED APPLICATIONS

The present application claims the benefits of U.S. Provisional Application Ser. No. 60/379,064, filed May 9, 2002, which is incorporated herein by this reference.

The subject matter of the present application is related to the following applications, each of which has a filing date of May 9, 2003: Ser. No. 10/434,550 entitled Single-Sided Sputtered Magnetic Recording Disks to Clasara et al.; Ser. No. 10/435,361 entitled Dual Disk Transport Mechanism Processing Two Disks Tilted Toward Each Other to Grow et al.; Ser. No. 10/435,360 entitled Method of Merging Two Disks Concentrically Without Gap Between Disks to Buitron; Ser. No. 10/434,551 entitled Apparatus for Combining or Separating Disk Pairs Simultaneously to Buitron et al.; Ser. No. 10/435,572 entitled Method of Simultaneous Two-Disk Processing of Single-Sided Magnetic Recording Disks to Buitron et al.; Ser. No. 10/435,161 entitled W-Patterned Tools for Transporting/Handling Pairs of Disks to Buitron et al.; Ser. No. 10/435,295 entitled Method for Servo Pattern Application on Single-Side Processed Disks in a Merged State to Valeri; Ser. No. 10/434,547 entitled Method for Simultaneous Two-Disk Texturing to Buitron et al.; Ser. No. 10/435,227 entitled Cassette for Holding Disks of Multiple Form Factors to Buitron et al.; Ser. No. 10/434,546 entitled Automated Merge Nest for Pairs of Magnetic Storage Disks to Crofton et al.; Ser. No. 10/435,293 entitled Apparatus for Simultaneous Two-Disk Scrubbing and Washing to Crofton et al.; Ser. No. 10/435,362 entitled Cassette Apparatus for Holding 25 Pairs of Disks for Manufacturing Process to Buitron et al.; and Ser. No. 10/434,540 entitled Method of Lubricating Multiple Magnetic Storage Disks in Close Proximity to Buitron et al. Each of these applications is incorporated by reference in its entirety as if stated herein.

FIELD OF THE INVENTION

The present application relates generally to information storage media and particularly to single-sided information storage media.

BACKGROUND OF THE INVENTION

Hard disk drives are an efficient and cost effective solution for data storage. Depending upon the requirements of the particular application, a disk drive may include anywhere from one to twelve hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

As aerial bit densities of hard disks have dramatically increased in recent years, the large data storage capacities of dual-sided magnetic storage media far exceed demand in many applications. For example, dual-sided hard disks in personal computers have much greater storage capacity than most consumers require during the useful life of the computer. Consumers thus are forced to pay substantial amounts for excess data storage capacity. The intense price competition in the magnetic storage media industry has forced many disk drive manufacturers to offer single-sided magnetic storage media as an alternative. Single-sided storage media are of two types. In one type, a double-sided disk configured to store information on both sides of the disk is installed with a single read/write head serving only one side of the disk. In the other type, known as a single-sided processed disk, only one side of the disk is provided with an information-containing magnetic layer. The other side of the disk does not have an information-containing layer. Single-sided processed storage media not only have sufficient storage capacities to satisfy most consumers but also can be manufactured less expensively.

One frequently encountered problem in single-sided processed disk manufacture is distinguishing the media storage or active side of the disk from the inactive side of the disk. Distinguishing the two sides from one another can be extremely important not only in disk manufacture but also in disk installation during manufacture and later repair of the host device. If the active side position is reversed with the inactive side position during disk manufacturing, not only would the final disk have to be discarded leading to an enormous yield losses but also would the service life of processing equipment/components be substantially reduced. If the disk is installed upside down in an information storage device, the read/write head will be unable to effect information storage and retrieval. Moreover, the read/write head may be damaged during use due to the improper finish of the inactive side. The inactive side generally lacks proper thin film and lubrication layers.

Figure 1:
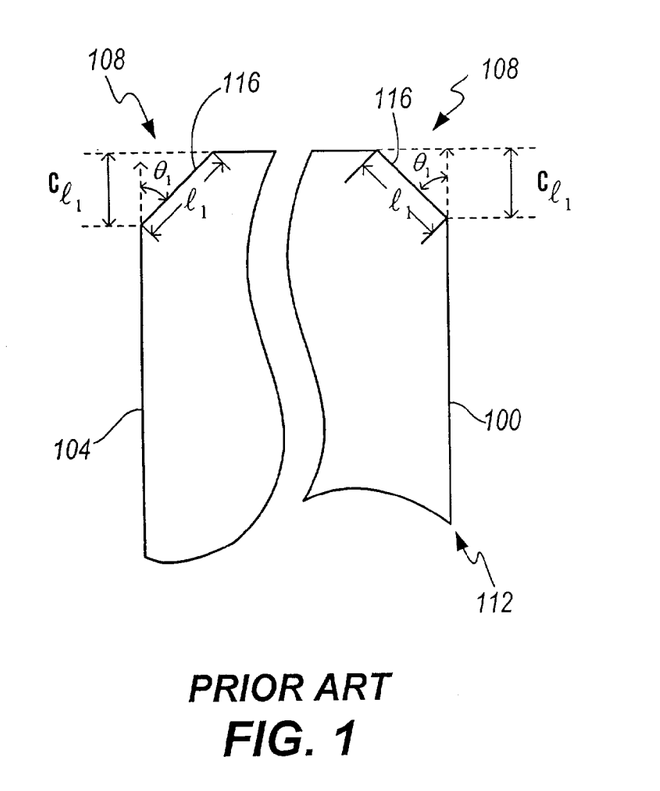
FIG. 1 is a cross-section view of a prior art magnetic disk.

As can be seen in FIG. 1, which is a cross-section of an outer periphery of a conventional magnetic disk, the inactive side 100 is indistinguishable from the active side 104. For example, an identical chamfer 108 is used on both sides of the disk 112; in other words, each chamfer has the same angle $\theta_1$, the same chamfer length $l_1$, and the same length $l_1$ of the chamfer surface 116. As will be appreciated, the chamfer is used for a variety of reasons, including controlling the chipping and distortion of the disk and also minimizing cassette material wear and abrasion during handling and shipment and to facilitate lead in of the read/write head on the disk during read/write operations.

SUMMARY OF THE INVENTION

These and other needs are addressed by the various embodiments and configurations of the present invention. The present invention is generally directed to information storage media, such as disks, having dissimilar or differently shaped chamfers on different sides of the medium. The information storage media can be of any shape, with a disk-shape being typical, and can use any information storage technique, such as magnetic, optical, and magneto-optical, with magnetic storage techniques being preferred. In a particularly preferred configuration, the information storage medium is a magnetic hard disk.

The first and second chamfers can have a variety of planar shapes when viewed through a cross-section of the medium. By way of example, the first and second chamfers, respectively, can have different first and second chamfer angles, different first and second chamfer lengths, and/or different first and second chamfer surface lengths. As will be appreciated, the first and second chamfers may be adjacent to one another at one end of the medium or may be at opposite ends of the medium. In a magnetic hard disk, for example, the first and second chamfers maybe located at the inner and/or outer peripheries of the disk.

The first and second chamfers can also have a variety of non-planar shapes when viewed through a cross-section of the medium. For example, one or both of the first and second chamfers can be an arcuate surface. In one configuration, each of the chamfers has a circular arcuate surface and the surfaces have different radii. In another configuration, an identification feature is located on the chamfer surface. For example, a radial groove or step can be located on the first and/or second chamfer.

The medium can be single- or dual-sided. In other words, one or both surfaces of the medium can be "active". As used herein, "active" or "information-containing" means that the disk surface is configured to store data. In a preferred embodiment, the medium has an active (first) side and an inactive (second) side. As used herein, "inactive", "nonactive," or "noninformation-containing" means that the medium surface is not configured to store data. For example, the active side of the medium has an information storage layer(s), such as a magnetic layer, while the inactive side of the medium has no information storage layer(s). To maximize data storage capacity, the chamfer length on the active side is preferably less than the chamfer length on the inactive side.

The information storage media of the present invention can be used in any information storage device, such as a personal computer, a laptop computer, set top boxes, personal digital assistants, cameras, music players, communication devices, and other consumer electronic devices.

The present invention can have a number of advantages compared to conventional storage media. For example, the use of dissimilar chamfers can provide an effective technique for distinguishing the media storage or active side from the inactive side of the disk, not only in disk manufacture but also in disk installation during manufacture and later repair of the host information storage device. The invention thereby can reduce the likelihood that the active side position is reversed with the inactive side position, thereby providing, in disk manufacture, a higher disk yield and a longer service life of processing equipment/components and, in information storage device manufacture/repair, lower rates of defective devices and a longer service life for the read/write head. The use of differently shaped chamfers can facilitate disk merging and demerging. The chamfer on the contact merged or gap merged sides of the disk can be much larger than the chamfers on the opposite (or outwardly facing) sides of the disk to provide much more chamfer surface area for the merging/demerging functions. The placement of the enlarged chamfers on the inactive side of the disk does not effect a reduction in disk information storage capacity, as in the use of enlarged chamfers on dual-(active) sided disks.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
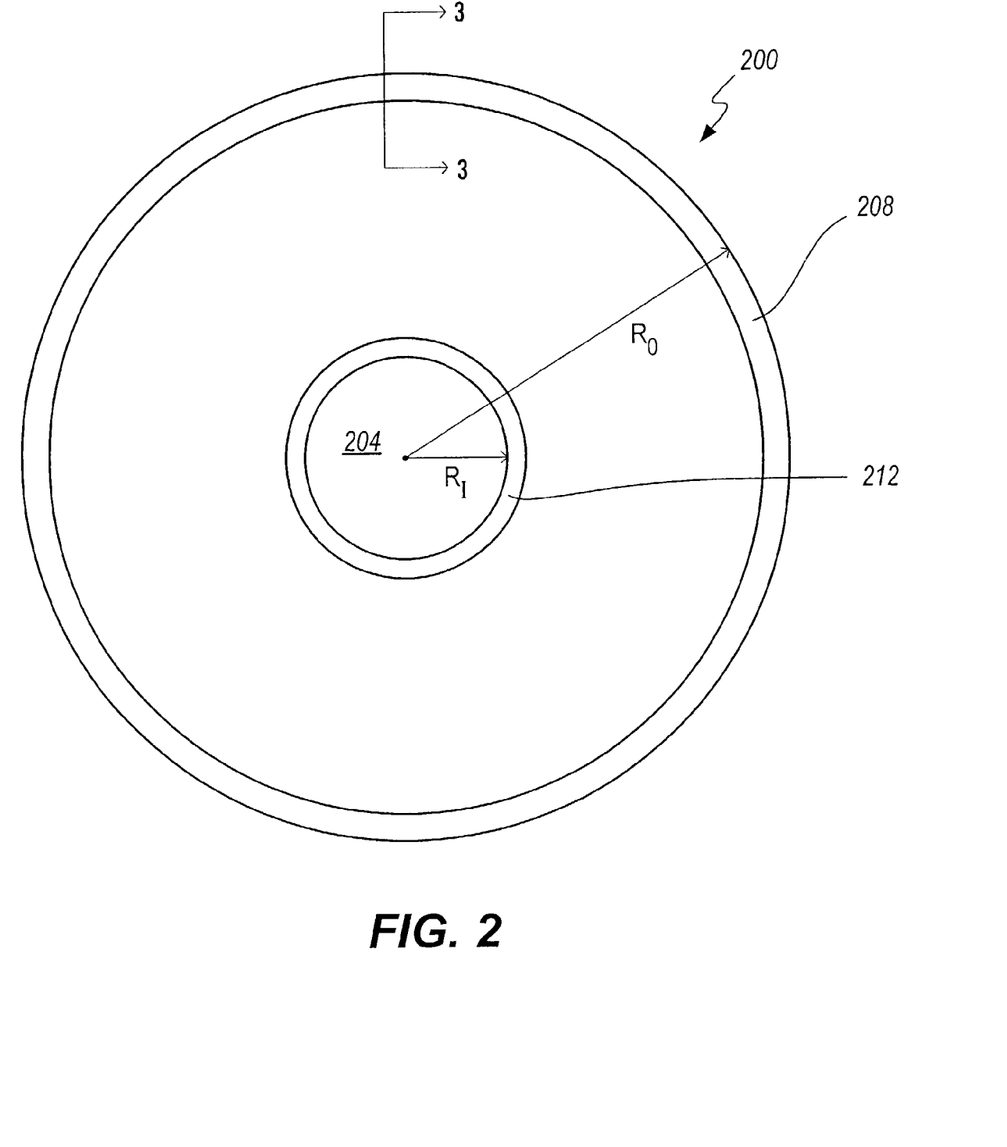
FIG. 2 is a plan view of a magnetic disk according to an embodiment of the present invention.

FIG. 2 is a plan view of the active (or inactive) side of a disk according to an exemplary embodiment of the present invention. The disk 200 comprises an outer radius $R_o$ and an inner radius $R_I$. The inner diameter or periphery is defined by a hole 204 for receiving a hub, spindle, or other rotational mechanism. The outer diameter or outer periphery and the inner periphery each include outer and inner chamfers 208 and 212, respectively. The chamfer extends radially around the diameter of the outer and inner peripheries. The same features are located on the reverse side of the disk. As will be appreciated, the disk, in other configurations, may include only the outer chamfer or the inner chamfer, depending on the application.

As can be seen FIGS. 3A through 3G the outer chamfers on the active and inactive sides of the disk (or inner chamfers on the active and inactive sides of the disk) are dissimilar or differently shaped. The differing shapes permit one to identify or distinguish, typically visually and mechanically, the active and inactive sides from one another. Although FIGS. 3A through 3G illustrate a variety of differing shapes for the chamfers, it is to be understood that the figures are not intended to be exhaustive. An infinite number of other shapes may be employed to identify or distinguish the active and inactive sides.

Figure 3A:
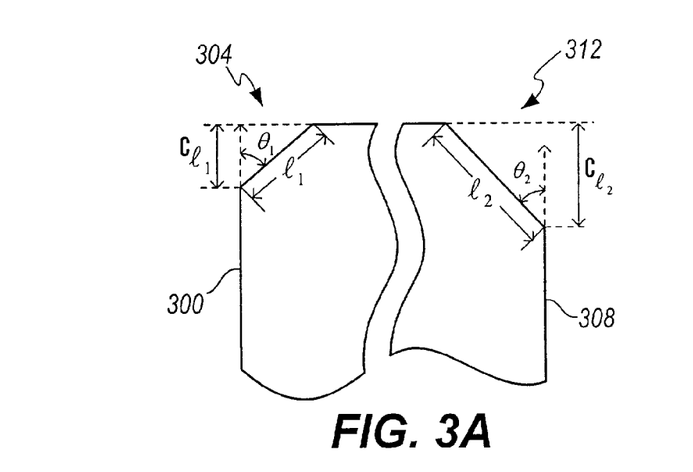
FIG. 3A is a cross-section view along line 3—3 of FIG. 2.

Referring to a first disk configuration in FIG. 3A, the active side 300 has a first chamfer 304 while the inactive side 308 has a second chamfer 312. The first and second chamfer angles θ are identical while the chamfer length $C_{L1}$ and chamfer surface length $l_1$ for the first chamfer 304 are different from the chamfer length $C_{L2}$ and chamfer surface length $l_2$ for the second chamfer 312. As can be seen from FIG. 3A, it is generally preferred, though not required, that the active side 300 of the disk 200 have the smallest chamfer length to provide the active side 300 with as much as surface area as possible for storing information. The first chamfer length typically ranges from about 0.004 to about 0.008 inches while the second chamfer length typically ranges from about 0.003 to about 0.300 inches. Because the inactive side of the disk does not store information, there is considerable freedom in selecting the dimensional parameters of the second chamfer.

Figure 3B:
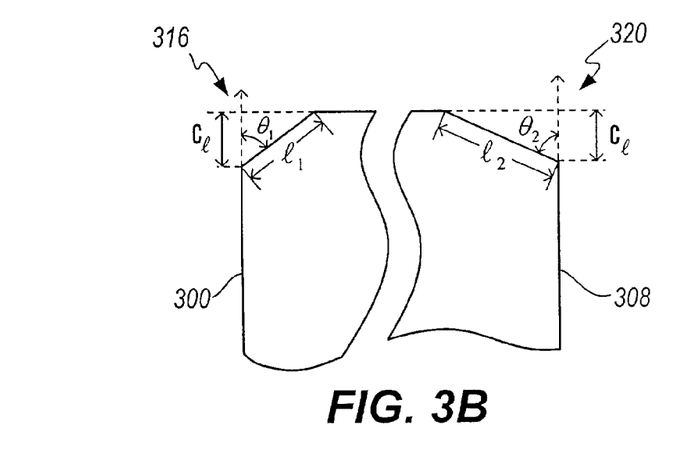
FIG. 3B is a cross-section view along line 3—3 of FIG. 2.

Referring to a second disk configuration in FIG. 3B, the first and second chamfer lengths $C_L$ and $C_L$ for the first and second chamfers 316 and 320 are identical while the first and second chamfer angles $\theta_1$ and $\theta_2$ and chamfer surface lengths $l_1$ and $l_2$ are different. The first chamfer angle typically ranges from about 25 to about 50° while the second chamfer angle typically ranges from about 2 to about 60°.

Figure 3C:
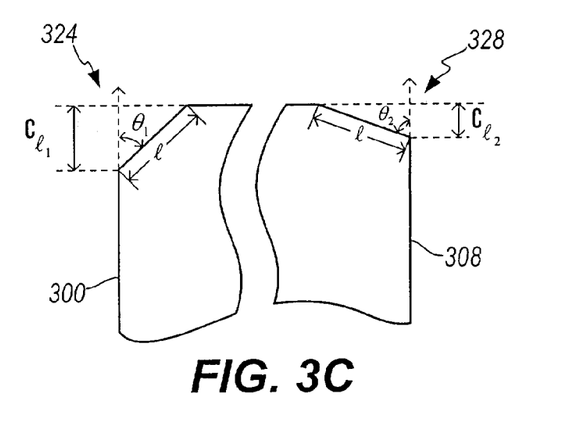
FIG. 3C is a cross-section view along line 3—3 of FIG. 2.

Referring to a third disk configuration in FIG. 3C, the surface lengths l of the first and second chamfers 324 and 328 are identical while the first and second chamfer lengths $C_{L1}$ and $C_{L2}$ and the first and second chamfer angles $\theta_1$ and $\theta_2$ and chamfer surface lengths $l_1$ and $l_2$ are different. In the depicted configuration, the second chamfer length for the inactive side 300 of the disk is smaller than the first chamfer length active side 308 of the disk.

Figure 3D:
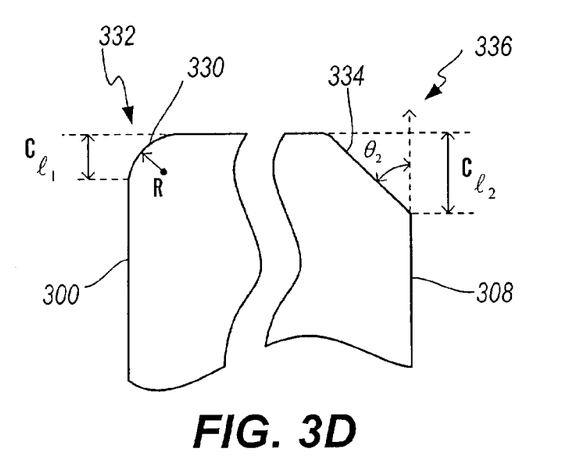
FIG. 3D is a cross-section view along line 3—3 of FIG. 2.

Referring to a fourth disk configuration in FIG. 3D, it is possible to have a nonplanar (or nonflat) surface for a chamfer. The depicted chamfer surface 330 for the first chamfer 332 is arcuate in shape while that 334 for the second chamfer 336 is planar in shape. The radius R of the first chamfer surface 330 is shown. As will be appreciated, the first chamfer surface 330 can be non-circular. Examples include parabolic, and elliptical, in shape. As can be seen, the first and second chamfer lengths $C_{L1}$ and $C_{L2}$ are different.

Figure 3E:
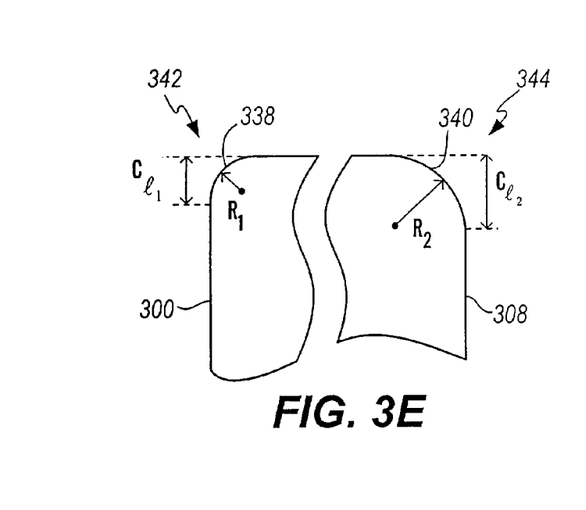
FIG. 3E is a cross-section view along line 3—3 of FIG. 2.

Referring to a fifth disk configuration in FIG. 3E, it is possible to have a nonplanar (or nonflat) surface for each of the first and second chamfers. The depicted chamfer surfaces 338 and 340 for the first and second chamfers 342 and 344 are each arcuate in shape. The radii $R_1$ and $R_2$ of the first and second chamfer surfaces 338 and 340, respectively, are shown. As will be appreciated, the first and/or second chamfer surfaces can be non-circular. Examples include parabolic and elliptical in shape. As can be seen, the first and second chamfer lengths $C_{L1}$ and $C_{L2}$ are different.

Figure 3F:
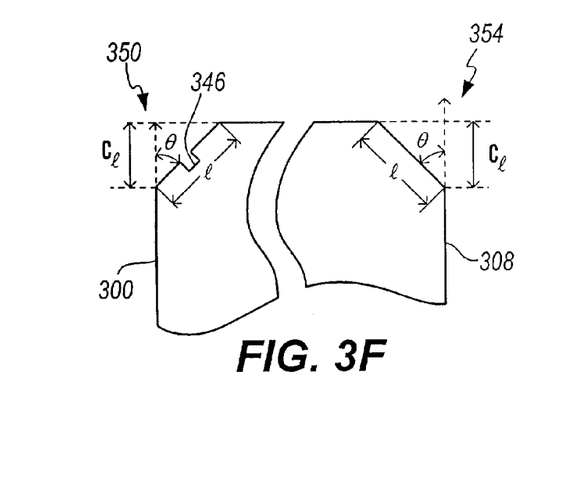
FIG. 3F is a cross-section view along line 3—3 of FIG. 2.

Referring to a sixth disk configuration in FIG. 3F, it is possible to have an identifiable design feature in the first and/or second chamfer to facilitate identification of the active and inactive disk sides. As can be seen from FIG. 3F, the first and second chamfer lengths $C_L$, first and second chamfer surface lengths l, and the first and second chamfer angles θ are identical to one another. Identification of one disk side versus the other is made possible by a groove 346 on the first chamfer 350. As will be appreciated, the groove could alternatively or additionally (a differently shaped or positioned groove) be located on the second chamfer 354. As will also be appreciated, the groove could be replaced by a variety of other differently shaped surface indentations, depending on the application.

Figure 3G:
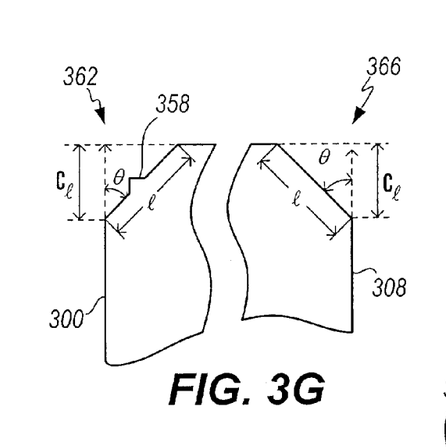
FIG. 3G is a cross-section view along line 3—3 of FIG. 2.

Referring to a seventh disk configuration in FIG. 3G, it is possible to have a raised design feature on the first and/or second chamfer to facilitate identification of the active and inactive disk sides. As can be seen from FIG. 3G, the first and second chamfer lengths $C_L$, first and second chamfer surface lengths l, and the first and second chamfer angles θ are identical to one another. Identification of one disk side versus the other is made possible by a step 358 on the first chamfer 362. As will be appreciated, the step could alternatively or additionally (a differently shaped or positioned step) be located on the second chamfer 366. As will also be appreciated, the step could be replaced by a variety of other differently shaped raised surface features, depending on the application.

Figure 4:
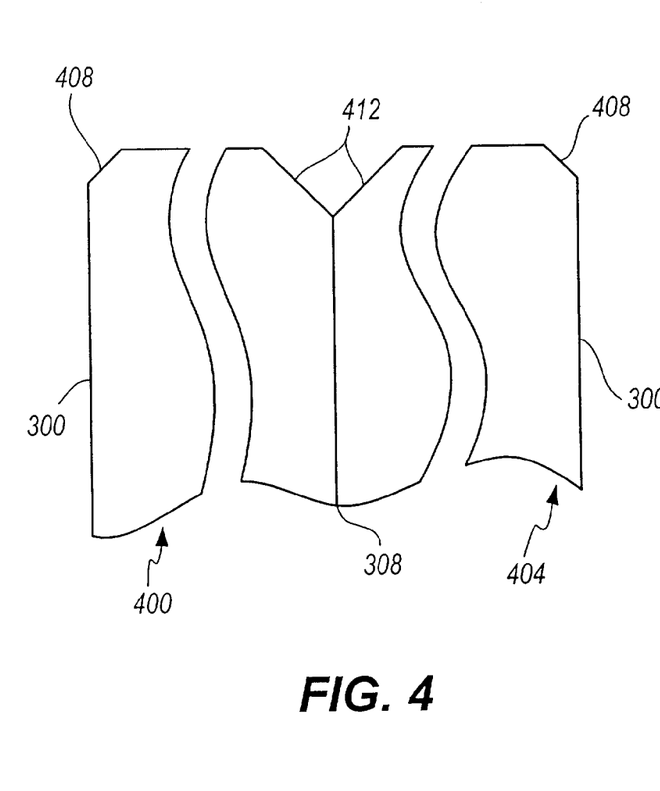
FIG. 4 shows two merged disks according to an embodiment of the present invention.

FIG. 4 depicts first and second disks 400 and 404, each having identical sets of first and second chamfers 408 and 412 merged for simultaneous processing. The active sides 300 each face outward while the inactive sides 308 face each other. The inactive sides may be in contact with (and substantially parallel to) one another as shown (contact merged) or may be separated by a gap (gap merged). The processing of the active sides includes polishing, sputtering, data zone texturing, layer zone texturing, tubing, tape burnishing, testing, and washing. The second chamfers 412, being differently shaped or dissimilar to the first chamfers 408, permit ready identification (and disk merging/demerging), by a merging tool or demerging tool or by sight, of the active and the inactive sides.

Figure 5:
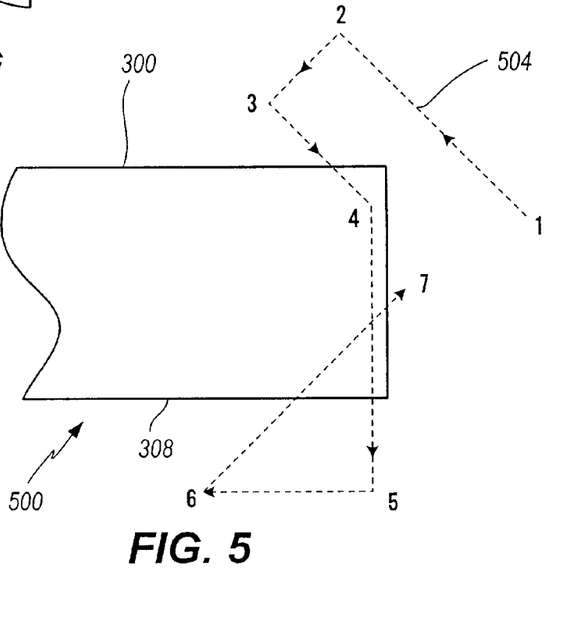
FIG. 5 shows the line of travel of a diamond tool bit to form dissimilar chamfers according to an embodiment of the present invention.

FIG. 5 depicts a cross-section of a stamped disk 500 prior to shaping by a suitable cutting/shaping tool, such as a diamond tool bit. Computerized Numerical Control machining programs that determine how machining tool bits (which is normally a single-point, diamond insert in the case of magnetic disk substrates) travel may be configured to yield differently shaped first and second chamfers. As will be appreciated, other techniques, such as an alternative tool (e.g., preformed tool bit), can be used to form the chamfers. As illustrated by FIG. 5, the path 504 of the tool bit (not shown) starts at point "1", moves linearly to point "2", moves linearly at a right angle to point "3", moves linearly at an obtuse angle to point "4" moves linearly vertically to point "5", moves linearly at yet another right angle to point "6", and finally moves linearly at an acute angle to point "7". The depicted path permits a single-point bit to create two dissimilar or differently shaped chamfers on the active and inactive sides 300 and 308 of the disk.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An information storage medium, comprising:
opposing first and second sides of a substrate having first and second chamfers, respectively, wherein the first chamfer has a different shape from the second chamfer, wherein the first and second chamfers are located on peripheral edges of the substrate, and wherein at least one of the first and second sides of the substrate is positioned underneath and supports an active layer.

2. The medium of claim 1, wherein the information storage medium is a magnetic hard disk and wherein the active layer is a magnetic layer, wherein the second side is inactive.

3. The medium of claim 2, wherein at least one of the first and second chamfers is an arcuate surface.

4. The medium of claim 3, wherein both of the first and second chamfers are arcuate surfaces, the first and second chamfers, respectively, have a first and second radius, and the first and second radii are different.

5. The medium of claim 2, wherein one of the first and second chamfers is an arcuate surface and the other of the first and second chamfers is a planar surface.

6. The medium of claim 2, wherein the first and second chamfers are located on a same end of the disk.

7. The medium of claim 1, wherein the first and second chamfer, respectively, have first and second chamfer angles and the first and second chamfer angles are different.

8. The medium of claim 1, wherein the first and second chamfers, respectively, have first and second chamfer lengths and the first and second chamfer lengths are different.

9. The medium of claim 1, wherein the first and second chamfers, respectively, have first and second chamfer surface lengths and the first and second chamfer surface lengths are different.

10. The medium of claim 1, wherein at least one of the first and second chamfers comprises a radial groove.

11. The medium of claim 1, wherein at least one of the first and second chamfers comprises a radial step.

12. The medium of claim 1, wherein the medium is disk shaped and wherein the medium has an inner hole bounded by an inner periphery of the disk.

13. The medium of claim 12, wherein the first and second chamfers are located adjacent to an inner periphery of the disk and wherein the peripheral edges of the substrate are the inner peripheral edges of the substrate.

14. The medium of claim 12, wherein the first and second chamfers are located adjacent to an outer periphery of the disk and wherein the peripheral edges of the substrate are the outer peripheral edges of the substrate.

15. The medium of claim 1, wherein one of the first and second sides is active and the other of the first and second sides is inactive.

16. The medium of claim 15, wherein the chamfer length on the active side of the medium is less than the chamfer length on the inactive side of the medium.

17. An information storage device comprising the medium of claim 1.

18. A magnetic hard disk, comprising:
opposing first and second sides having opposing first and second chamfers, respectively, wherein the first chamfer is dissimilar from the second chamfer, wherein the first and second chamfers are located on peripheral edges of a substrate supporting at least one active layer of the disk, and wherein at least one of the first and second sides of the disk is positioned underneath and supports the active layer.

19. The disk of claim 18, wherein the first and second chamfer, respectively, have first and second chamfer angles and the first and second chamfer angles are different.

20. The disk of claim 18, wherein the first and second chamfers, respectively, have first and second chamfer lengths and the first and second chamfer lengths are different.

21. The disk of claim 18, wherein the first and second chamfers, respectively, have first and second chamfer surface lengths and the first and second chamfer surface lengths are different.

22. The disk of claim 18, wherein at least one of the first and second chamfers is an arcuate surface.

23. The disk of claim 22, wherein both of the first and second chamfers are arcuate surfaces, the first and second chamfers, respectively, have a first and second radius, and the first and second radii are different.

24. The disk of claim 18, wherein one of the first and second chamfers is an arcuate surface and the other of the first and second chamfers is a planar surface.

25. The disk of claim 18, wherein at least one of the first and second chamfers comprises a radial groove.

26. The disk of claim 18, wherein at least one of the first and second chamfers comprises a radial step.

27. The disk of claim 18, wherein the first and second chamfers are located on a same end of the disk.

28. The disk of claim 18, wherein the disk is disk shaped and wherein the disk has an inner hole bounded by an inner periphery of the disk.

29. The disk of claim 28, wherein the first and second chamfers are located adjacent to an inner periphery of the disk and wherein the peripheral edges of the substrate are the inner peripheral edges of the substrate.

30. The disk of claim 28, wherein the first and second chamfers are located adjacent to an outer periphery of the disk and wherein the peripheral edges of the substrate are the outer peripheral edges of the substrate.

31. The disk of claim 18, wherein one of the first and second sides is active and the other of the first and second sides is inactive.

32. The disk of claim 31, wherein the chamfer length on the active side of the disk is less than the chamfer length on the inactive side of the disk.

33. An information storage device comprising the disk of claim 18.

34. A single-sided magnetic hard disk, comprising:
opposing first and second sides of a substrate having opposing first and second chamfers, respectively, wherein the first chamfer is dissimilar from the second chamfer, wherein the first side is capable of storing information and the second side is incapable of storing information, wherein the first and second chamfers are located on peripheral edges of a substrate supporting at least one active layer of the disk, and wherein the first side of the substrate is positioned underneath and supports an active layer for containing information.

35. The disk of claim 34, wherein the first and second chamfer, respectively, have first and second chamfer angles and the first and second chamfer angles are different.

36. The disk of claim 34, wherein the first and second chamfers, respectively, have first and second chamfer lengths and the first and second chamfer lengths are different.

37. The disk of claim 34, wherein the first and second chamfers, respectively, have first and second chamfer surface lengths and the first and second chamfer surface lengths are different.

38. The disk of claim 34, wherein at least one of the first and second chamfers is an arcuate surface.

39. The disk of claim 38, wherein both of the first and second chamfers are arcuate surfaces, the first and second chamfers, respectively, have a first and second radius, and the first and second radii are different.

40. The disk of claim 34, wherein one of the first and second chamfers is an arcuate surface and the other of the first and second chamfers is a planar surface.

41. The disk of claim 34, wherein at least one of the first and second chamfers comprises a radial groove.

42. The disk of claim 34, wherein at least one of the first and second chamfers comprises a radial step.

43. The disk of claim 34, wherein the first and second chamfers are located on a same end of the disk.

44. The disk of claim 34, wherein the disk is disk shaped and wherein the disk has an inner hole bounded by an inner periphery of the disk and wherein the peripheral edges of the substrate are the inner peripheral edges of the substrate.

45. The disk of claim 44, wherein the first and second chamfers are located adjacent to an inner periphery of the disk and wherein the peripheral edges of the substrate are the inner peripheral edges of the substrate.

46. The disk of claim 44, wherein the first and second chamfers are located adjacent to an outer periphery of the disk and wherein the peripheral edges of the substrate are the outer peripheral edges of the substrate.

47. The disk of claim 34, wherein the chamfer length on an active side of the disk is less than the chamfer length on an inactive side of the disk.

48. An information storage device comprising the disk of claim 34.

49. A method for manufacturing a disk drive, the disk drive including recording disk, comprising:
(a) forming first and second dissimilarly shaped chamfers in opposing first and second sides of a common substrate or said recording disk, wherein the first and second chamfers are located on peripheral edges of the substrate; and
(b) thereafter forming an active layer on at least one of the first and second sides.

50. The method of claim 49, wherein the first and second chamfers are both located on outer peripheral edges of the substrate.

51. The method of claim 49, wherein the first and second chamfers are both located on inner peripheral edges of the substrate.

52. The method of claim 49, wherein at least one of the following is true: (i) the first and second chamfer, respectively, have first and second chamfer angles and the first and second chamfer angles are different, (ii) the first and second chamfers, respectively, have first and second chamfer lengths and the first and second chamfer lengths are different, and (iii) the first and second chamfers, respectively, have first and second chamfer surface lengths and the first and second chamfer surface lengths are different.

53. The method of claim 52, wherein (i) is true.

54. The method of claim 52, wherein (ii) is true.

55. The method of claim 52, wherein (iii) is true.

56. The method of claim 49, wherein the second side is free of an active layer.

57. A disk drive manufactured by the steps of claim 49.

* * * * *